June 26, 1934. W. BAUERSFELD 1,964,239
MICROSCOPE
Filed April 25, 1933
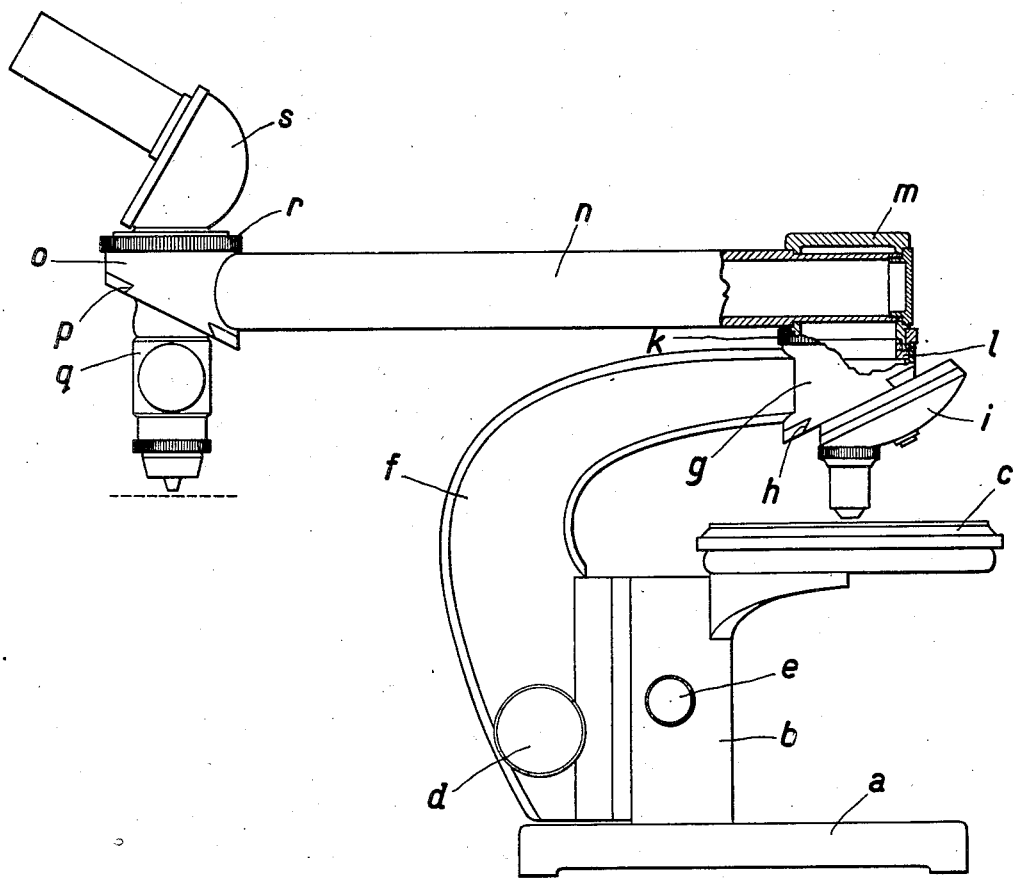
Inventor:
Walther Bauersfeld.

Patented June 26, 1934

1,964,239

UNITED STATES PATENT OFFICE 1,964,239

MICROSCOPE

Walther Bauersfeld, Jena, Germany, assignor to the firm of Carl Zeiss, Jena, Germany Application April 25, 1933, Serial No. 667,839
In Germany April 30, 1932

2 Claims. (Cl. 88—39)

I have filed an application in Germany, April 30, 1932.

As a rule, microscopes of the usual kind permit to examine only objects of comparatively small dimensions, which proves to be a great disadvantage when large objects are concerned. To avoid this inconvenience is the aim of the present invention.

The usual microscopes have a pillar bracket which is rigidly connected to, or integral with, an intermediate body containing an objective (a single objective or an objective combined with other objectives). Either the intermediate body is fixedly mounted on the pillar bracket, this bracket partaking of the focusing adjustments, or it has the form of the usual microscope tubes and may be displaced relatively to the pillar bracket. According to the invention, the said microscopes may be used for viewing objects of great dimensions when they are provided with an arm whose one end is attached to the said intermediate body, preferably to the upper part of this body, and which has at its other end another intermediate body containing parts which provide that the observation takes place in the direction of the objective of the first said intermediate body. In either of the said two cases, the observation parts may be constructed for microscoping with transmitted or with incident light.

Although the arm may have any position relative to the symmetry plane of the microscope, it is especially advantageous to so connect this arm to the intermediate body fixed to the pillar bracket that it may be given different angles to the said symmetry plane. It is therefore advisable to mount the arm on this intermediate body in such a manner that it may be rotated about an axis parallel to that of the objective, that it may be fixed in any position, and interchanged, for instance, with the ocular part of the microscope The accompanying drawing, which illustrates the invention, represents in elevation, partly in section, one constructional example of a microscope for the examination of objects of great dimensions.

The microscope has a base $a$ with a gear box $b$ supporting a stage $c$. The coarse and fine adjustments are effected by means of milled heads $d$ and $e$, respectively. The focusing adjustments act upon a pillar bracket $f$ to the upper end of which is attached an annular intermediate body $g$. This body $g$ has a slide guide $h$ for a revolving nose-piece $i$, a vertical illuminator or the like. At the upper end of the body $g$, a ring $l$ screwed to a bearing body $m$ may be fixed by means of a knurled ring $k$. The bearing body $m$ contains the one end of a horizontal arm $n$ to the other end of which is attached another intermediate body $o$ having a slide guide $p$ for a vertical illuminator $q$ or the like, the said illuminator being equipped with an objective. By means of a knurled ring $r$, an ocular part $s$ is screwed to the upper end of the intermediate body $o$.

When using the instrument, the knurled ring $k$ is to be loosened and the arm $n$, given the desired position by rotating it about the axis of the ring $l$, which coincides with the axis of the appertaining objective. The knurled ring $k$ is now screwed tight again and the ring $l$ and bearing body $m$, clamped to the intermediate body $g$. The focusing adjustments of the observation parts $q$ and $s$ are effected by means of the milled heads $d$ and $e$. When it is not desired to examine objects of great dimensions, the knurled ring $k$ is loosened and the arm $n$, removed. Instead of the arm $n$, the ocular vart $s$ may be fixed to the intermediate body $g$ by means of the knurled ring $r$, a microscope of the usual form being at disposal.

I claim:

1. A microscope comprising a pillar bracket, an intermediate body rigidly connected to this bracket and adapted to contain optical parts for microscopical observation which consist of at least an objective, an arm, one end of this arm being detachably provided on this intermediate body, and another intermediate body at the other end of the said arm, this other intermediate body being adapted to contain optical parts consisting of at least an ocular and an objective for microscopical observation in a direction parallel to the axis of the first said objective.

2. In a microscope according to claim 1, the said arm being rotatable about an axis parallel to the axis of the first said objective.

WALTHER BAUERSFELD.